Figure 1:
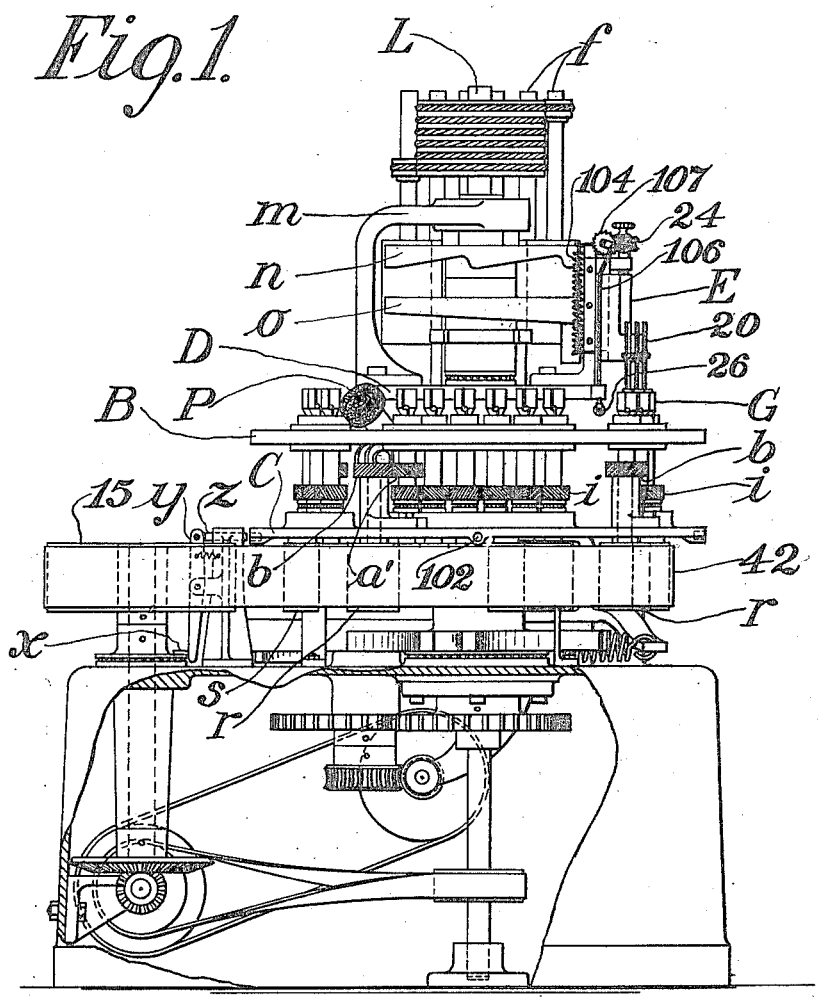

J. H. HAMMANN.
MACHINE FOR FACING AND DRILLING BUTTONS.
APPLICATION FILED APR. 28, 1913.

1,160,997.

Patented Nov. 16, 1915.
6 SHEETS—SHEET 2.

WITNESSES:
H. E. Hartwell.
M. A. Hunter

INVENTOR.
John H. Hammann.
BY Chapin &Co
ATTORNEYS

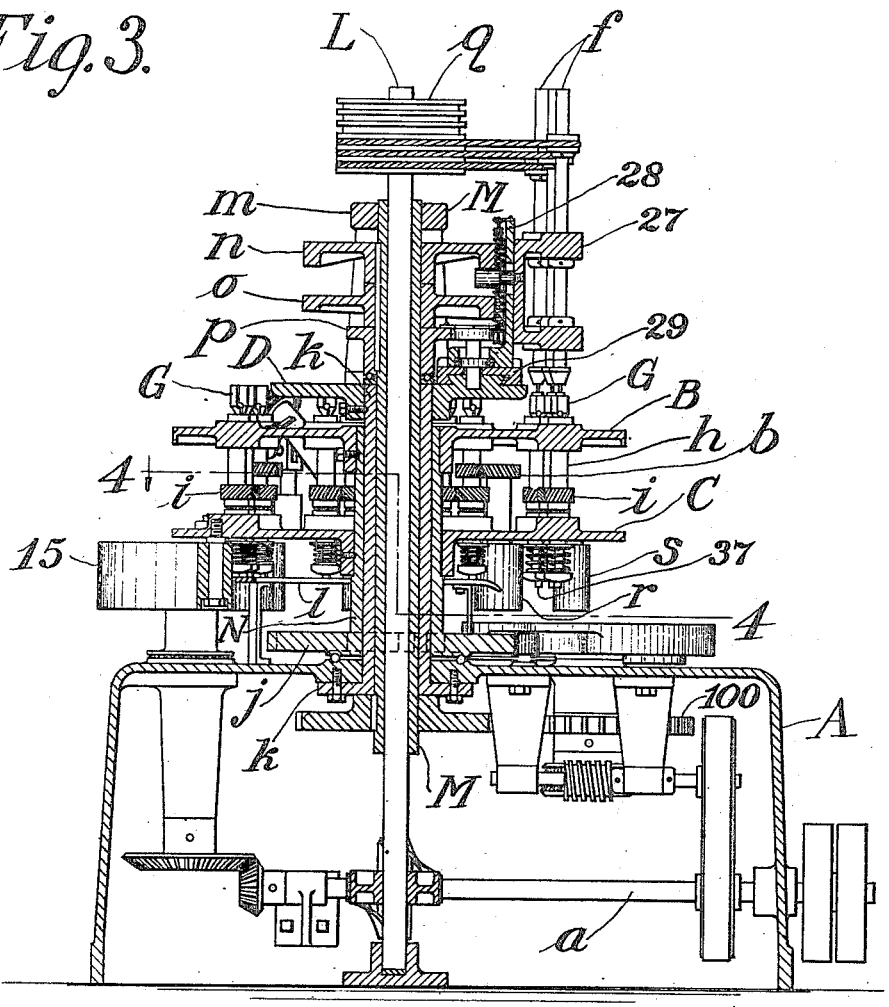

J. H. HAMMANN.
MACHINE FOR FACING AND DRILLING BUTTONS.
APPLICATION FILED APR. 28, 1913.
1,160,997.
Patented Nov. 16, 1915.
6 SHEETS—SHEET 4.
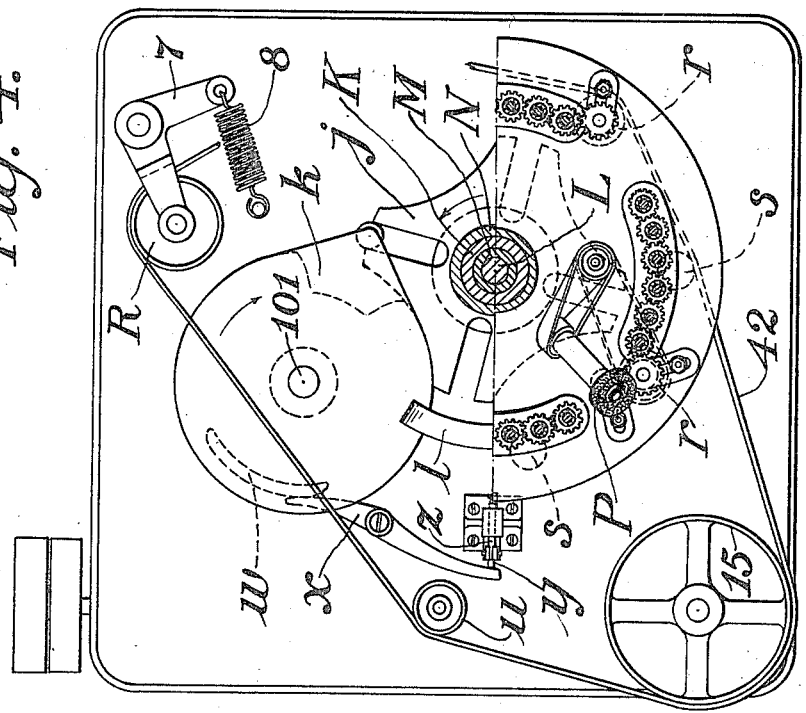
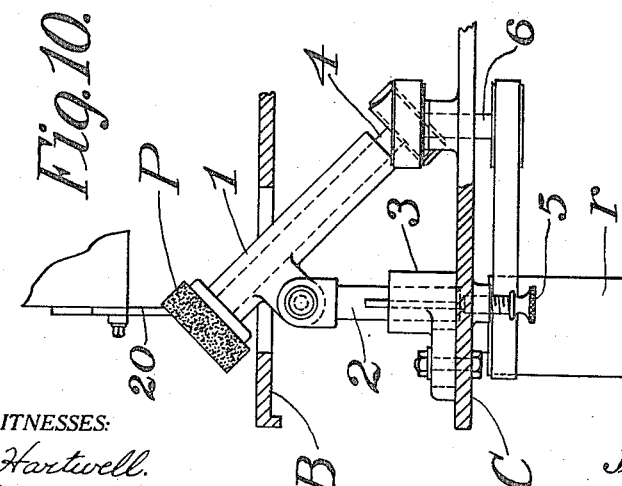
WITNESSES:
F. E. Hartwell.
M. C. Hunter.
INVENTOR.
John H. Hammann.
BY
Chapin & Co.
ATTORNEYS J. H. HAMMANN.
MACHINE FOR FACING AND DRILLING BUTTONS.
APPLICATION FILED APR. 28, 1913.

1,160,997.

Patented Nov. 16, 1915.
6 SHEETS—SHEET 5.

WITNESSES:
H. E. Hartwell.
M. A. Hunter

INVENTOR.
John H. Hammann.
BY
Chapin & Co.
ATTORNEYS

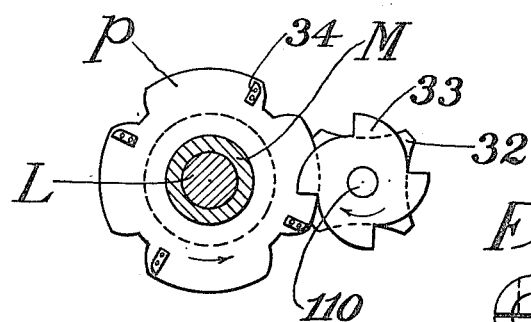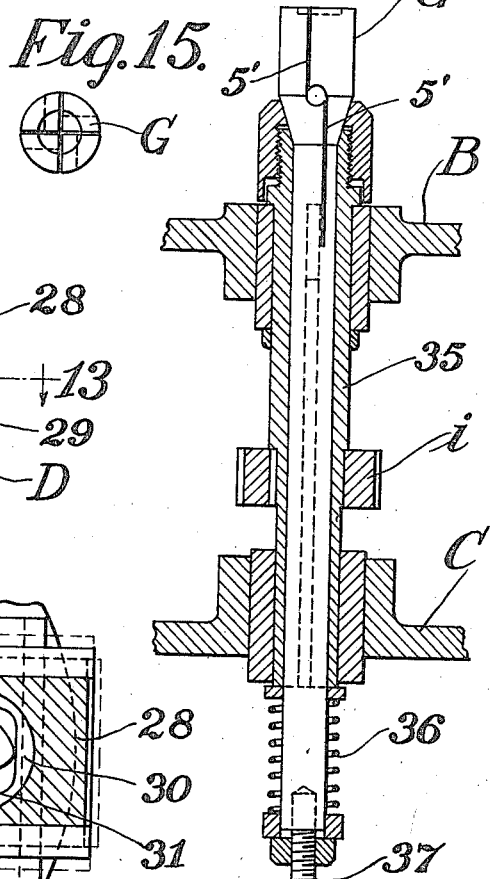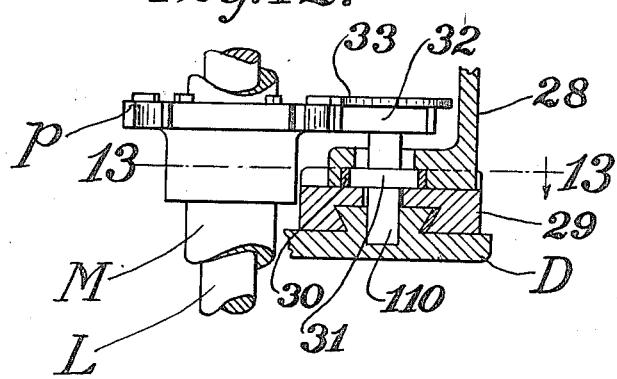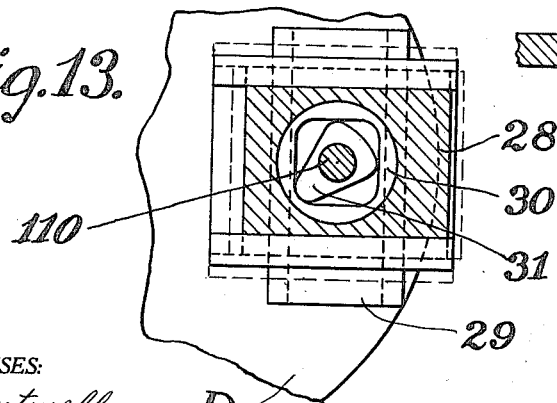

UNITED STATES PATENT OFFICE.

JOHN H. HAMMANN, OF FLORENCE, MASSACHUSETTS.

MACHINE FOR FACING AND DRILLING BUTTONS.

1,160,997.   Specification of Letters Patent.   Patented Nov. 16, 1915.

Application filed April 28, 1913. Serial No. 764,089.

*To all whom it may concern:*

Be it known that I, JOHN H. HAMMANN, a citizen of the United States of America, residing at Florence, in the county of Hampshire and State of Massachusetts, have invented new and useful Improvements in Machines for Facing and Drilling Buttons, of which the following is a specification.

This invention relates to machines for making buttons.

The object of the invention is to provide a machine of improved construction for making buttons in an automatic manner.

Another object of the invention is to provide for making several buttons at one and the same time, preferably by providing means for arranging the buttons in sets, each set comprising one series of buttons, and for performing different operations on the several sets of buttons simultaneously. With this arrangement, each series of buttons comprising a given set is operated on to accomplish each manufacturing step simultaneously, and the different sets of buttons have different operations performed thereon simultaneously and the sets are passed through the several operations successively.

Another object of the invention is to arrange, combine, and balance the mechanisms for making the buttons so that the desired work will be performed in a rapid manner.

Another object of the invention is to combine and arrange the button facing and drilling tools so that, while the buttons of one set are being faced, the buttons of another set are being drilled at the same time.

Another object of the invention is to provide improved means for sharpening the facing-tools in the normal operation of the machine in an automatic manner.

Another object of the invention is to provide improved means for feeding the facing-tools to the work and automatically compensate for the grinding of the tools.

Another object of the invention is to provide improved means for feeding the drills to the work and for placing the drills successively for the different holes desired in the buttons.

Other objects of the invention are to generally improve the details and arrangement in a machine of the class described.

In order to obtain a clear understanding of my invention and to illustrate a preferred manner in which the invention has been reduced to practice in an operable machine, reference may be had to the accompanying drawings, which disclose a specific embodiment of my invention. These drawings are used for illustrative purposes only and not with any intention of limiting the invention, broadly, to the specific embodiment shown herein.

Figure 2:
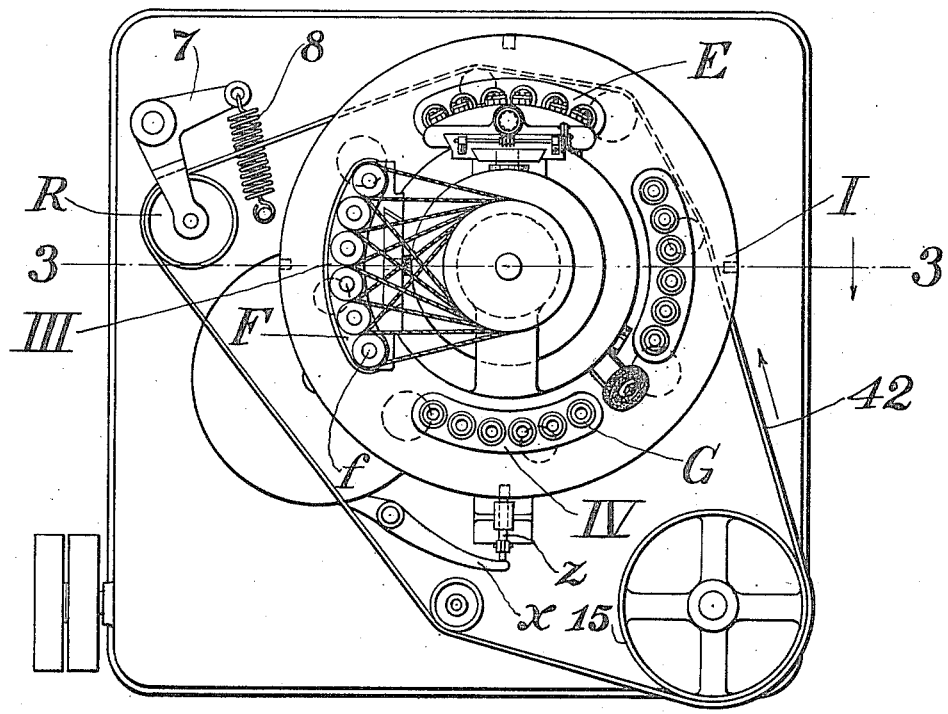
Figure 5:
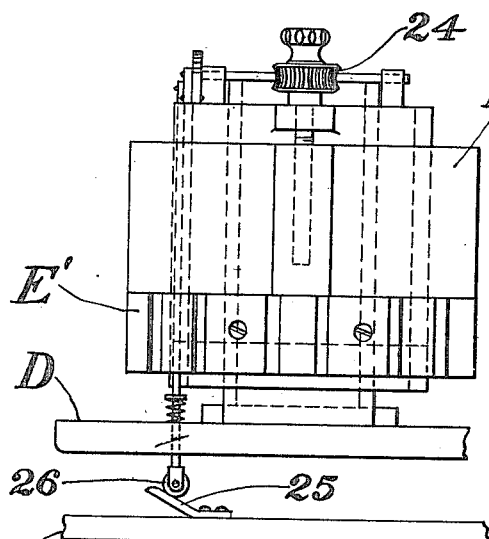
Figure 6:
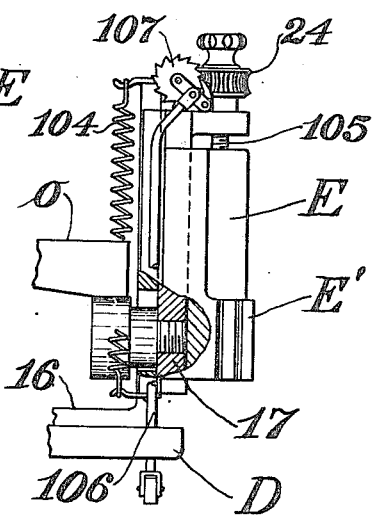
Figure 7:
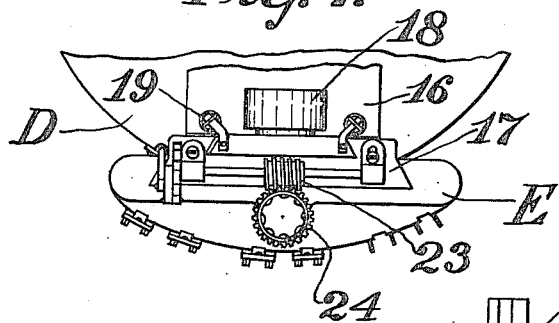
Figure 8:
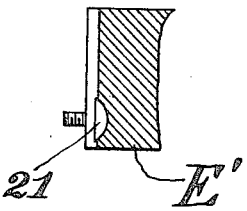
Figure 9:
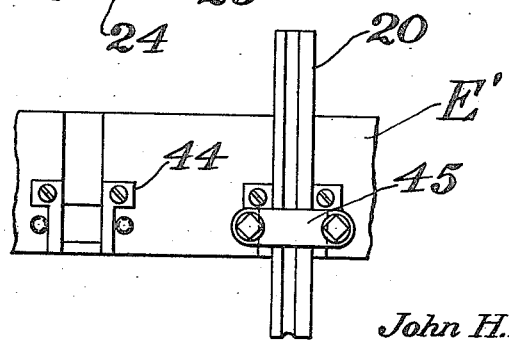

Referring to the drawings, Figure 1 is a side elevation of the assembled machine with a part of the base-plate broken away to illustrate the driving connections therein. Fig. 2 is a plan view of the machine. Fig. 3 is a sectional view taken on line 3—3 of Fig. 2. Fig. 4 is a sectional plan view taken on line 4—4 of Fig. 3. Figs. 5, 6, and 7 are detail views of the mechanism for holding and operating the facing-tools. Figs. 8 and 9 are detail views showing the manner of holding the facing-tools. Fig. 10 is a detail view showing the sharpening device for the facing-tools. Figs. 11, 12, and 13 are detail views showing the mechanism to place each drill successively in different positions to drill the desired holes in the button opposite the particular drill, and Figs. 14 and 15 are detail views of the chuck mechanism for holding the button blanks during the different button making operations.

In the embodiment of the invention shown (see Fig. 2), there are four sets of blank-holding-chucks carried by an intermittently-rotating turret. There are six chucks in each chuck set. All the blanks held in one set of chucks are fed thereto while the turret is at rest and the chucks open. The turret is then given a quarter turn to bring the six blanks under six facing-tools. During this quarter turn, the chucks are automatically operated to grip and hold the blanks therein. A second set of chucks, following the first one mentioned, is brought to feeding position in the turret's quarter rotation mentioned. As the latter set is being fed with blanks, those in the first set are faced simultaneously by means of the suitably-arranged facing-tools. The turret then takes another quarter turn, bringing the first set to drilling position, the second set to facing position, and a third set to feeding position. When the turret comes to rest, the three operations of drilling, facing, and feeding blanks take place simultaneously with respect to buttons and the chucks of the respective sets. Another quarter turn of the turret brings the buttons now formed in the first set of chucks to discharging position, in which the buttons are released and automatically taken therefrom by suction or other suitable devices. A fourth set of chucks is by this last turn brought to feeding position and the second and third sets brought to drilling and facing positions, respectively. By these combined operations, it will be seen that six buttons, in the form of machine shown, will be finished and delivered at each quarter turn of the turret.

The manner of mounting the chucks in the turret, and operating them in the desired manner with relation to the tools, will now be described. Referring to Fig. 3, the turret-plates B and C are fixed to the sleeve N which revolves on ball-bearings on the bed-plate A. Each chuck G is mounted in the turret-plates in the manner shown in Fig. 14. On the sleeve 35 is keyed a gear $i$, and the whole is stepped on a ball-bearing mounting, as indicated in Fig. 1. The chucks are of the self-closing type, in which (Fig. 14) the spring 36 normally closes the jaws in a well-known manner, as indicated. The extension 37 is designed to ride on a cam as the turret-plates are rotated, and, thus, move the chuck-spindle against the spring 36 to hold the chucks open at desired points. In button-making, there is considerable fine dust made, due to the drilling and facing operations. To prevent this dust from getting in between the spring-jaws of the chucks, the jaws are made by making staggered cuts 5′, as shown in Fig. 14, joined by pockets. The dust in working down the first cut 5′ will be received by the pocket and thus will not work farther into the cuts to prevent their proper operation. The six chucks comprising each set of chucks (see Fig. 1) are connected together by the intermeshing gears $i$, and one of the six chucks has a gear $a'$ meshing with a gear $b$ on a vertical shaft adjustably mounted rotatably in the turret-plate C. On this same shaft is a pulley $r$ (see Figs. 1 and 3) located under the turret-plate and arranged to be driven by a horizontally-driven belt 42. This belt is driven from pulley 15, which, in turn, is driven from the main drive-shaft $a$ through the bevel-gear arrangement shown in Fig. 3. As hereinbefore stated, the turret carries four sets of chucks and is operated in a step-by-step manner, making four steps in each revolution. The belt 42 is designed to rotate each set of chucks as the latter are brought into the position in which the buttons are faced. The upper set of chucks in Fig. 2 is shown in this position, the belt 42 engaging the pulley $r$ (shown dotted) of that set of chucks but engaging none of the other pulleys $r$. Between each pair of the latter are idle guiding-pulleys, shown dotted and smaller than pulleys $r$. From Fig. 2 it will be seen that as each set of chucks is stepped into the upper position by the movement of the turret-plates, the belt 42 will engage the drive-pulley $r$ of that set, passing also around the tension-pulley R and the idle-pulleys back to pulley 15. It will be noted that the chuck-spindles of each set are thus rotated only when they are moved into what has been termed the "button facing" position, indicated by II in Fig. 2.

The manner of giving a step-by-step rotation to the turret-plates B and C to give the quarter turn mentioned, will now be described. Referring to Figs. 3 and 4, the "Geneva" arrangement $j$ and $k$ is driven from the main shaft $a$ by a belt and worm-and-gear arrangement (see Fig. 3) with shaft 101. The plate or cam $k$ is fast to shaft 101 and drives plate $j$, integral with the turret-carrying sleeve N, by a roller which successively engages with the radial slots in plate $j$. Thus, the sleeve N makes a quarter turn at each revolution of plate $k$, having a period of rest determined by the length of arc of plate $k$ which engages the concentric edge of plate $j$, thus holding the latter in locked position until the roll of plate $k$ again engages one of the radial slots in plate $j$. It will be noticed that plate $k$ is cut away in the neighborhood of its operating roll to enable the projecting portions of plate $j$ to clear plate $k$ when they move together. As an additional lock for the turret-plates during their periods of rest, a bracket mounted on the bed-plate has a rod $z$ slidingly mounted therein and adapted to engage one of the four positioning sockets 102 (see Fig. 1) in turret-plate C at each quarter turn. Rod $z$ is connected at its outer end to rod $y$ pivoted to the bracket mentioned and having a spring connection with the bracket normally pulling rod $z$ toward the edge of the turret-plate. Just prior to the movement of the plate $j$ by plate $k$, a cam $w$ on plate $k$ operates the rod $x$ to rock rod $y$ on its pivot and move $z$ out of engagement with the socket 102. The rod $y$ is released during the turning movement of plate $j$ so that when the latter has made its quarter turn, rod $z$ is pulled into the next socket 102, thus positioning and locking the turret for its period of rest. It is preferable to thus supply a turret locking and positioning device because the parts of the "Geneva" arrangement $k$ and $j$ are liable to wear and not of themselves properly lock and position the turrets, which would result in considerable trouble.

As the turret-plates turn, the chucks carried thereby are opened and closed automatically in a manner now to be described. Referring to Fig. 2, the button blanks are fed to the set of chucks in the position of the turret-plates indicated by I, the facing operation takes place in the position indicated by II, the drilling operations by III, and the discharge operations by IV. In positions I and IV, the chucks are open to aid in feeding the blanks and taking off the finished buttons respectively. In positions II and III, the chucks are closed to hold the button blanks for the facing and drilling operations. As previously described in connection with Fig. 14, the chucks are normally closed by a spring 36 mounted on each chuck. By reference to Fig. 3, it will be seen that, as each chuck moves from the position under the drills, the end 37 of the spindle rides up on a cam-plate *l* concentric with and mounted on brackets from bed-plate A below the turret-plate c. This cam-plate *l* extends through an arc sufficient to keep the chucks open until just before they are moved to the position under the facing-tools, where the cam *l* ends and springs 36 force the chucks to close automatically and grip the button-blanks.

The manner of operating and mounting the facing-tools will now be described. A bracket 16 (see Fig. 7), mounted on the table D, which, in turn, is mounted on the stationary sleeve K fastened to the bed-plate A (see Fig. 3), has a vertical dove-tail slide 17 constructed thereon for vertical reciprocating movement. The spring 104 (see Fig. 6), fastened at one end to the top of bracket 16 and at the other end to the bottom of slide 17, presses a roll mounted on the slide against the cam *o*. The latter is keyed to a sleeve M which is rotated by suitable gears, seen clearly in Fig. 3, driven by the worm and wheel drive connection with main shaft *a*. The slide 17, in turn, carries another vertical dove-tail slide E, as shown. A vertical feed-screw 105, mounted on slide 17, determines the vertical position of slide E with respect to slide 17. It is to be understood that slide E is moved with slide 17 by the cam *o*, as shown in Fig. 6. The block E′, mounted by suitable screws on slide E, holds all the facing-tools and is adjusted manually or automatically with respect to its position on slide 17. By removing block E′ from slide E, the six facing-tools may be taken from slide E and another block E′ with adjusted facing-tools may be quickly placed thereon. As the tools wear and are sharpened, they will need to be brought properly to the work held by the chucks. Each facing-tool 20, there being six in all, is mounted on the block E′ against a rocking-seat 21 (see Figs. 8 and 9) and clamped in place by means of the strap 45. This permits of a nice adjustment of the cutting edge of each facing-tool. If it is assumed that the six chucks of one set are in position for the facing operation on the button blanks therein, then the cam *o* (see Fig. 6) will move the slide 17 downwardly, thus carrying the slide E and the six tools 20 downwardly so that the cutting edges of the tools will be fed to the button-blanks held firmly by the chucks, as before described. It will be remembered that in the button-facing position, the chucks are being rotated, and, with the tools fed down to the work as just described, it will be understood that the button-blanks will be faced into a form corresponding with the cutting edge of the tools 20. The cam *o* holds the tools on position against the work until the blanks are faced, after which it allows the spring 104 to pull the slide 17 and move the tools away from the work and the chucks to be moved away from the tools and the next set of chucks moved to the tools. The edges of the cutting-tools need to be frequently sharpened in order to do the best work. This sharpening operation will be described later. It will be understood that as the tools are sharpened, it is necessary to feed the slide E downwardly a certain distance with relation to the slide 17 in order to compensate for the wear on the tools. This is done automatically by means of the screw-feed 105 which is turned by worm and wheel arrangement 23 and 24 (see Fig. 7). The worm 23 is mounted on a shaft fixed in brackets on the top of the slide 17. This shaft is turned by means of a ratchet mechanism 107 mounted on the end of the shaft and operated as indicated in Fig. 6 by the vertical reciprocations of rod 106, on the lower end of which is a small roller. The cam 25 (see Fig. 5), located on the outer, upper edge of the turret-plate B, at every complete revolution of the turret-plate engages the roller on the end of rod 106 and lifts it, causing the ratchet 107 to move a small part of a revolution, which, in turn, through the worm 23 and the wheel 24, operates the feed-screw 105 to lower the slide E a small distance with respect to the slide 17, which distance is sufficient to compensate for the automatic sharpening of each of the facing-tools by means of a grinding wheel in a manner to be described. When it is desired to regulate the tools by hand, one of the brackets holding the worm-shaft may be loosened and moved horizontally, as indicated in Fig. 7, in order to move the worm 23 out of engagement with the wheel 24. When this has been done, the feed-screw 105 may be turned by hand so that the slide E will be adjusted to move the tools into the desired position.

At each complete revolution of the turret-plates, it is planned, in the embodiment of the invention shown, to sharpen all the facing-tools in an automatic manner. The sharpening operation will now be described. Referring to Fig. 10, the turret-plate C has an adjustable bracket 3 in which a vertical rod 2 is adjustably mounted and fixed in its vertical position by means of the adjustingscrew 5 on which the rod 2 is stepped. On the upper end of this rod 2 is swiveled a sleeve 1 in which the shaft of a grinding-wheel is rotatably mounted. This shaft is driven by means of a pulley on the end thereof and a belt running over said pulley and another pulley on a vertical stud-shaft 6 which is mounted in the turret-plate C, as indicated. This stud-shaft 6, in turn, is driven through a belt connection with one of the pulleys $r$. It will be remembered that the pulley $r$ is driven by the belt 42 (see Fig. 4) when the set of chucks, with which the particular pulley $r$ is associated, is in the button-facing position. Referring to Fig. 4, it will be seen that the grinding-wheel P is mounted in the rear of one particular set of chucks, and it will be seen from Fig. 10 that the grinding-wheel P, by means of the bracket 3 and the swiveled connection with the rod 2, may be adjusted to a proper position for grinding the edges of the facing-tools 20. With the grinding-wheel properly adjusted, it can be seen from the drawings that it will be driven whenever the set of chucks with which it is associated is in button-facing position. After the blanks held by this set of chucks have been faced by the tools and during the following step-by-step movement, the grinding-wheel P, under full rotation, will sweep along the six cutting tools and sharpen their cutting edges in the manner indicated in Figs. 4 and 10. As soon as the particular set of chucks mentioned have moved to the drilling position, its driving-pulley $r$ will no longer be engaged by the pulley 42, so that the rotation of the grinding-wheel will stop. By this mechanism, the facing-tools are sharpened at every complete revolution of the turret-plates, and the shortening of the facing-tools, due to this sharpening operation, is automatically compensated for by means of the operation of the feed-screw 105 operated in the manner above described.

The manner in which the drilling operations are arranged to take place will now be described, together with the structure found most convenient for this work. Assuming that a set of chucks carrying button-blanks which have been faced are now at rest in the button-drilling position of the turret-plates' rotation, it will be understood that the chucks are stationary and that the drilling-spindles revolve. In making buttons with a machine of the class described, it is often desired to drill four holes in the button-blanks. Sometimes two holes are drilled. The particular embodiment shown herein is designed to drill four holes, this being the largest number customarily drilled and involving more complications than drilling only two holes. The way in which only two holes may be drilled will be obvious from the description of the mechanism for drilling four holes in each button. The drilling operations take place at position III indicated in Fig. 2. Each set of chucks is brought successively to the drilling position immediately after the chucks have occupied the button-facing position. A series of six drill-spindles $f$ are slidingly mounted in the movable bracket 27 (see Fig. 3). These spindles are driven from a pulley $q$ keyed to the vertical shaft L which is driven by a quarter-turn belt-connection with the main drive-shaft $a$. The driving means, from the pulley $q$ to the several spindles $f$, comprises separate driving ropes or belts arranged in the manner indicated in Figs. 2 and 3. There is one chuck holding a single drill at the end of each drill-spindle. The normal position for the drills is just above the plane of rotation of the button-blanks carried by the chucks G. When the button-carrying chucks have been moved to drilling position, the drills are fed downwardly just sufficiently to pierce one hole in each button. The drills are then moved upwardly, it being understood that the drills are rotating constantly, and then moved a slight distance and again fed downwardly to drill another hole in each button. In the form of the mechanism shown herein, there are four holes drilled in each button, and a single drill makes all four holes in one of the buttons held by the chucks G.

The manner in which the drills are fed to bore the holes and are then shifted to bore other holes, will now be described. The bracket 27 is slidingly mounted on vertical ways in the bracket 28 (see Fig. 3), and a small roller, extending through a slot in the bracket 28 and attached to the bracket 27, is spring-pressed in a manner clearly understood from the drawings against the surface of the cam $n$, which is keyed to the sleeve M which also carries cam $o$ and is driven as hereinbefore described. This cam $n$ will operate to lower all the drills four times at each revolution, and other means are provided to shift the position of the drills after each drilling operation. The bracket 28 is mounted (see Fig. 12) on horizontal ways on the upper side of slide 29. The last-mentioned ways extend in a radial direction with respect to the turret-plate B. The slide 29, in turn, is mounted on horizontal ways on the stationary table D, and these last-mentioned ways are arranged at right angles to the ways on the slide 29.

From Figs. 3, 12, and 13, it will be seen that the bracket 28 may be moved both in a radial direction by cam 31 and in a direction at right angles thereto because of the upper ways provided in table D which permit slide 29 to move when slide 28 is pressed sidewise by the cam against the ways in slide 29. These movements are given to the drill-carrying spindles $f$, carried by bracket 28, in an intermittent manner at a time when the spindles are free to shift their position just prior to being depressed for their drilling operation by means of the cam $m$. In order to obtain the required movements in an automatic manner, the following mechanism is provided. The stud-shaft 110 (see Fig. 12), is mounted vertically in the table D intermediate the ways provided therein. On this stud-shaft is keyed a cam 31 (see Fig. 13) which operates against a hardened steel insert-piece 30 in the bracket 28. At the upper end of the stud-shaft 110, is arranged a modified "Geneva" motion. This "Geneva" motion is driven from the sleeve M to which is keyed the cam $p$, shown best in Fig. 11. This cam $p$ has four recesses in its periphery equally distant around its circumference, and it coöperates with a plate 32 which may be called the locking plate, for when the outer concentric surface of the cam $p$ engages a concentric surface of the plate 32, the shaft 110 is locked, but it will be seen from Fig. 11 that four times in the revolution of the cam $p$ abutments 34 arranged thereon will engage the teeth of plate 33 and move the shaft 110 a quarter turn, at which time one of the projections on the plate 32 extends into one of the hollows in the cam $p$ to allow the cam and plate to clear during their movements together. By this means, the shaft 110 is given a step-by-step movement, comprising four steps in each revolution. By referring to Fig. 13, the shaft 110 is seen to drive the cam 31, and when this cam is given four step-by-step movements in each revolution, the first movement will cause the bracket 28 to slide radially in the ways on the upper side of slide 29. Another quarter turn of the cam 31 will cause the slide 29 to move at right angles to the radial direction on the ways provided in table D, for the bracket 28 is forced by cam 31 laterally against the sides of the ways on the upper side of slide 29, thus moving the latter in the stated direction. The next quarter turn will again move the bracket 28 radially, and the next quarter turn will move the bracket 28 at right angles to the radial direction but in the opposite direction to the former right angle movement. It will thus be seen that in the four quarter turns described, the bracket 28 describes a square, and, at each corner of the square, the bracket 28 comes to rest. At this time, the cam $n$ lowers the drill spindles carried by the bracket 28 to drill one of the holes in the buttons carried by the chucks G. The holes in each button are thus drilled at the four points of the square described by the horizontal movements of bracket 28, and the holes in each button are drilled by a single drill carried by the spindle immediately above the particular chuck G. If it is desired to drill only two holes in a button, it can be seen from Fig. 13 that the insert-piece 30 may be so formed that the slide 28 will only have a radial movement back and forth or only a back and forth movement at right angles thereto. This is accomplished by so forming a cam surface on the piece 30 that the cam 31 at each revolution will only engage diametrically opposite sides of the piece 30. This will avoid either the movement of the bracket 28 on the upper ways of slide 29 or the movement of the slide 29 on the ways provided in table D.

After the buttons have been drilled, the turret-plates are moved to bring the drilled buttons to position IV seen in Fig. 2. In this position, the buttons may be removed from the chucks G either by a pneumatic means or by hand. It is old to remove the buttons by pneumatic means, and such means are not shown in the drawings. It will be remembered that in positions IV and I the chucks are opened automatically by means of the cam $l$ seen in Fig. 3. After the buttons have been removed, the chucks are moved to feeding position where the button-blanks are fed to the open chucks in an automatic manner, or by hand.

One of the important features in this machine consists in the arrangement by which four operations—all that are necessary to making of a button in connection with the machine—can take place at one and the same time, and each operation can take place on more than one button; thus, while the buttons are being fed, other buttons are being faced, other buttons are being drilled, and other buttons are being removed from the machine. When these four operations on the several series of buttons have taken place, the machine is given a quarter turn and the operations start again. With an arrangement as described, a very large capacity is obtained for a machine of this description.

While applicant has described in detail for purposes of illustration a preferred form of his invention, the invention, broadly, is not limited to the specific details shown but by the scope of the appended claims.

What I claim, is,—

1. A self-contained automatic button-making machine, comprising rotatably-mounted turret-plates, four groups of work-carrying chucks arranged at equally spaced distances on said turret-plates, means for giving said turret-plates a step-by-step rotation to bring each group of chucks successively into three working positions, button-facing tools arranged above one of said positions, button-drilling tools arranged above another of said positions, means for operating the button-facing tools and the button-drilling tools to bring them into operable contact with the work held by said chucks during a period of rest between the step-by-step operations of the turret-plates and a grinding device and driving means therefor carried by said turret arranged to be intermittently rotated and to periodically engage and sharpen said facing tools when said turret is moved, all for the purpose described.

2. A self-contained automatic button-making machine, comprising, in combination, a frame, a rotatable chuck-carrying means thereon, several sets of chucks mounted on said means and arranged in a series of groups, button-making tools arranged in sets at one side of the chuck-carrying means, mechanism for bringing each group of chucks opposite each set of button-making tools successively and for locking them in position for the tools to operate on the work carried by the chucks, mechanism for feeding the button-making tools to the work in the chucks and for withdrawing the tools before each partial rotation of the chuck-carrying means, and a sharpening device and operating means therefor arranged on said chuck carrying means, whereby as the latter rotates said device will sharpen said tools, together with an auxiliary feed for said tools operable after each said sharpening operation to compensate for the wear in said operation.

3. A button-making machine, comprising, in combination, a series of button-holding chucks, a carrying device for the chucks, mechanism to give said carrying device a step-by-step movement through a closed path, a series of button-facing tools arranged at a side of the path at a point where the chucks come to rest in their step-by-step movement, mechanism to move said tools against the work held by the chucks, driving means for rotating the chucks when the tools are against the work, a series of drilling tools also arranged at a side of the plane at another point where the chucks come to rest in their step-by-step movement, a support, a carriage for said series of drills slidable on said support, means to move said carriage to feed the drills against the work held by the chucks, together with mechanism for shifting the position of the drills after each drilling operation, whereby one of the series of drills may drill the several holes in a given button, all for the purpose described, said mechanism comprising a pair of slides movable at right angles one to the other, said support being secured to one of said slides, a cam to coöperate with said slides to move said support and said drills in a predetermined path in a horizontal plane, and intermittently operable means to rotate said cam.

4. A self-contained automatic button-making machine, comprising rotatable chuck-carrying means, a series of work-carrying chucks rotatably mounted on said means, mechanism for giving a step-by-step rotation to said means, button-making tools arranged above the path of rotation of said chucks, mechanism for feeding the tools to the work carried by the chucks, a sharpening device and operating means therefor arranged on the chuck-carrying means, whereby as the latter rotates said device will sharpen the button-making tools, said device arranged for vertical adjustment in two planes.

5. A self-contained automatic button-making machine, comprising rotatable chuck-carrying means, a series of work-carrying chucks rotatably mounted on said means, mechanism for giving a step-by-step rotation to said means, button-making tools arranged above the path of rotation of said chucks, mechanism for feeding the tools to the work carried by the chucks, a sharpening device and operating means therefor arranged on the chuck-carrying means, whereby as the latter rotates said device will sharpen the button-making tools, together with means for adjusting the position of the tools to compensate for the wear thereof in the sharpening operation.

6. An automatic self-contained button making machine, comprising a frame, a centrally arranged vertical tubular standard thereon, a table fixed thereto, spaced turret plates, a sleeve to support said plates, mechanism on said frame to intermittently rotate said sleeve, four groups of blank holding chucks on said turret plates, a series of facing tools arranged on said table above one of said groups, a series of drills arranged on said table above another of said groups, a second sleeve within said tubular standard, drill and facing tool feeding devices operable therefrom, a shaft within said second sleeve, drill driving devices thereon, means to continuously rotate said shaft and second sleeve, said sleeves, shaft and tubular support having a common vertical axis, and means to rotate each group of chucks when they are positioned in under said facing tools.

JOHN H. HAMMANN.

Witnesses:
  FRANKLIN G. NEAL,
  MINNIE A. HUNTER.